ns011048400B2

(12) United States Patent
Ogawa

(10) Patent No.: US 11,048,400 B2
(45) Date of Patent: Jun. 29, 2021

(54) ELECTRONIC APPARATUS, CONTROL METHOD OF ELECTRONIC APPARATUS, AND NON-TRANSITORY COMPUTER READABLE MEDIUM

(71) Applicant: CANON KABUSHIKI KAISHA, Tokyo (JP)

(72) Inventor: Seiji Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/778,369

(22) Filed: Jan. 31, 2020

(65) Prior Publication Data

US 2020/0257439 A1 Aug. 13, 2020

(30) Foreign Application Priority Data

Feb. 8, 2019 (JP) .............................. JP2019-021431

(51) Int. Cl.
*G06F 3/0484* (2013.01)
*G06F 3/0488* (2013.01)

(52) U.S. Cl.
CPC ...... *G06F 3/04847* (2013.01); *G06F 3/04842* (2013.01); *G06F 3/04883* (2013.01); *G06F 2203/04105* (2013.01); *G06F 2203/04806* (2013.01); *G06F 2203/04808* (2013.01)

(58) Field of Classification Search
CPC ............. G06F 3/04847; G06F 3/04842; G06F 3/04883; G06F 2203/04105; G06F 2203/04806; G06F 2203/04808; G06F 3/147; G06F 3/04845; G06F 3/011; G06F 1/163; H04N 5/23293; H04N 5/23245; H04N 5/23238; G09G 5/391; G09G 2340/045; G09G 2340/0407; G09G 2354/00
See application file for complete search history.

(56) References Cited

U.S. PATENT DOCUMENTS

| 6,919,927 | B1 | 7/2005 | Hyodo ..................... 348/333.02 |
| 7,619,616 | B2 * | 11/2009 | Rimas Ribikauskas ..................... G06F 3/0412 345/173 |
| 9,417,754 | B2 * | 8/2016 | Smith .................... G06F 1/1647 |
| 10,339,721 | B1 * | 7/2019 | Dascola ................ G06F 3/0485 |

(Continued)

FOREIGN PATENT DOCUMENTS

| JP | H11-0355617 | 12/1999 |
| JP | 2013-058149 | 3/2013 |

*Primary Examiner* — Ibrahim A Khan
(74) *Attorney, Agent, or Firm* — Venable LLP

(57) ABSTRACT

An electronic apparatus includes: a receiving unit configured to receive a touch operation on a display surface; and a display control unit configured to perform control so that a list screen of items corresponding to contents stored in a storage is displayed, wherein, in a case where a first touch operation is performed for an item corresponding to a VR content, the display control unit performs control so that the VR content is displayed in a first display mode, in which a display magnification is a first magnification, and in a case where a second touch operation is performed for an item corresponding to a VR content, the display control unit performs control so that the VR content is displayed on the display surface in a second display mode, in which the display magnification is a second magnification which is lower than the first magnification.

16 Claims, 8 Drawing Sheets

(56) References Cited

U.S. PATENT DOCUMENTS

| | | | |
|---|---|---|---|
| 2013/0335573 A1* | 12/2013 | Forutanpour | G06F 3/011 |
| | | | 348/158 |
| 2014/0300569 A1* | 10/2014 | Matsuki | G09G 3/20 |
| | | | 345/173 |
| 2017/0064374 A1* | 3/2017 | Eim | H04N 5/23238 |
| 2018/0001198 A1* | 1/2018 | Frappiea | A63F 13/49 |
| 2018/0109751 A1* | 4/2018 | Choi | G06K 9/00671 |
| 2018/0113512 A1* | 4/2018 | Kang | G06F 3/04817 |
| 2018/0183996 A1* | 6/2018 | Takahashi | H04N 5/23293 |
| 2019/0014306 A1* | 1/2019 | Uchimura | H04N 5/2628 |
| 2019/0060742 A1* | 2/2019 | Moon | G06F 3/0346 |
| 2019/0219824 A1* | 7/2019 | Shinohara | H04N 5/64 |
| 2019/0332191 A1* | 10/2019 | Jeng | G06F 3/041 |
| 2019/0340807 A1* | 11/2019 | Suzuoki | G06F 3/012 |
| 2020/0014843 A1 | 1/2020 | Ogawa | H04N 5/23216 |

\* cited by examiner

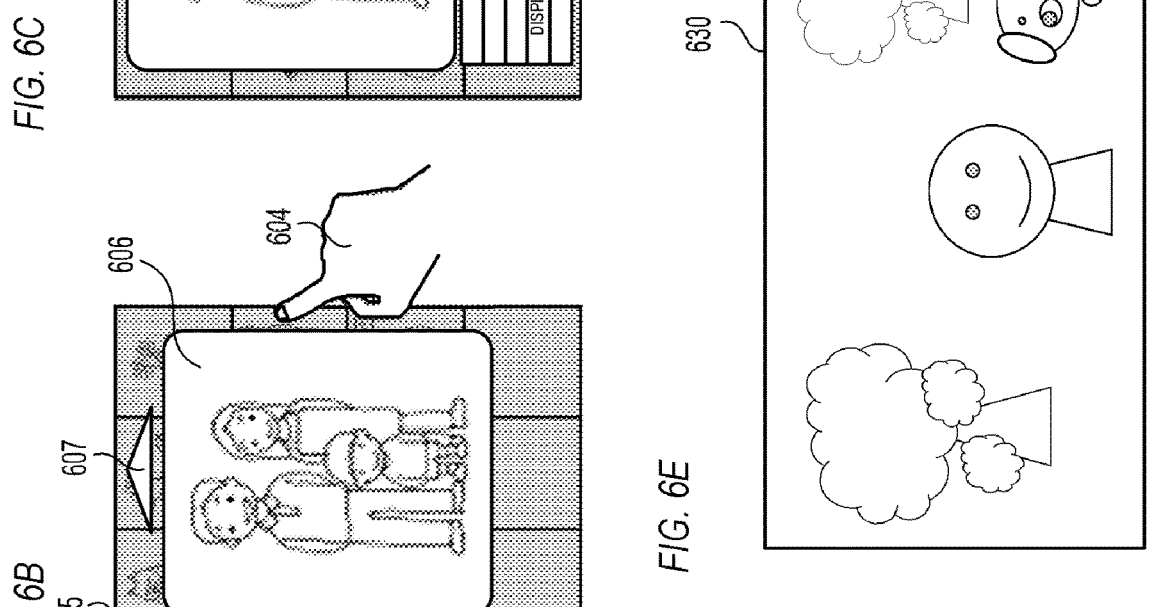
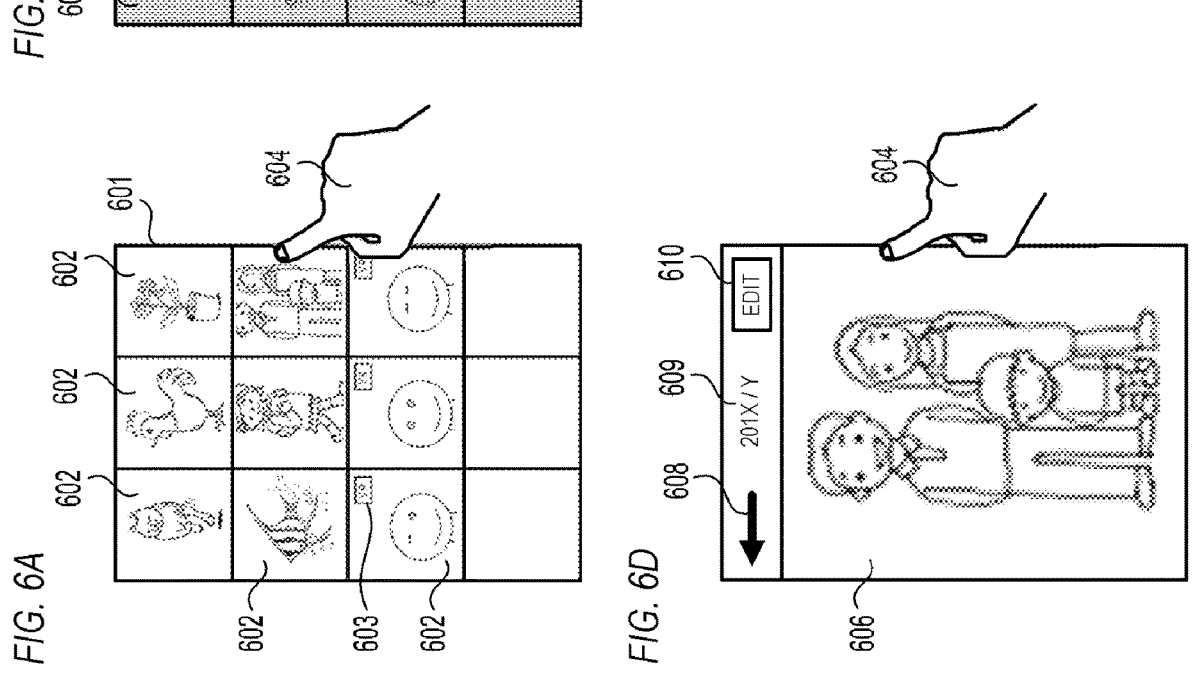

ELECTRONIC APPARATUS, CONTROL METHOD OF ELECTRONIC APPARATUS, AND NON-TRANSITORY COMPUTER READABLE MEDIUM

BACKGROUND OF THE INVENTION

Field of the Invention

The present invention relates to an electronic apparatus, a control method of the electronic apparatus, and a non-transitory computer readable medium, and more particularly to a control method of displaying an image having a wide range.

Description of the Related Art

In recent years, imaging apparatuses that can capture images having an image range wider than the human angle of view, such as omnidirectional images, are becoming popular. A method of displaying a part of an image having a wide image range on a screen and changing the range of the image displayed on the screen (display range) so as to follow the change of the orientation of the apparatus, in order to implement a display having high sense of immersion and realistic sensation (VR view), is also known.

Further, recently a technique to detect a pressing force to a touch panel is detected in the terminal (e.g. smartphone), and change the method of browsing for an image stored in the terminal in accordance with the intensity of the pressing force, is known. Such a technique improves the browsing operability of images captured by a smartphone in particular.

According to a technique disclosed in Japanese Patent Application Publication No 2013-58149, an image is selected when a tap operation on the image is detected, and an image is zoom-displayed if strong touch pressure (pressing force of touching) on the image is detected. According to the technique disclosed in Japanese Patent Application Publication No. H11-355617, touch pressure in a plurality of levels on the camera is detected, and a function to be activated is changed depending on the level of the touch pressure used out of the plurality of levels.

However, in the prior art, browsing operability can be appropriately improved for regular still images and moving images, but omnidirectional images are not considered, hence browsing operability cannot be improved appropriately for omnidirectional images even if prior art is used.

SUMMARY OF THE INVENTION

The present invention provides a technique to appropriately improve browsing operability of such VR content as omnidirectional images.

An electronic apparatus according to the present invention, includes at least one memory and at least one processor which function as: a receiving unit configured to receive a touch operation on a display surface; and a display control unit configured to perform control so that a list screen of items corresponding to contents stored in a storage is displayed on the display surface, wherein, in a case where a first touch operation is performed for an item corresponding to a VR content out of the items displayed on the list screen, the display control unit performs control so that the VR content is displayed on the display surface in a first display mode, in which a display magnification is a first magnification, and in a case where a second touch operation is performed for an item corresponding to a VR content out of the items displayed on the list screen, the display control unit performs control so that the VR content is displayed on the display surface in a second display mode, in which the display magnification is a second magnification which is lower than the first magnification.

Further features of the present invention will become apparent from the following description of exemplary embodiments with reference to the attached drawings.

BRIEF DESCRIPTION OF THE DRAWINGS

FIGS. 6A to 6K are examples of screens of the electronic apparatus.

DESCRIPTION OF THE EMBODIMENTS

Figure 1A:
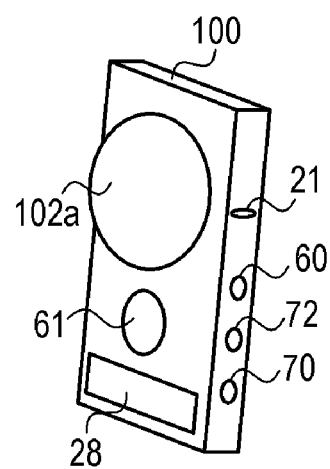
FIGS. 1A and 1B are external views of a digital camera.
Figure 1B:
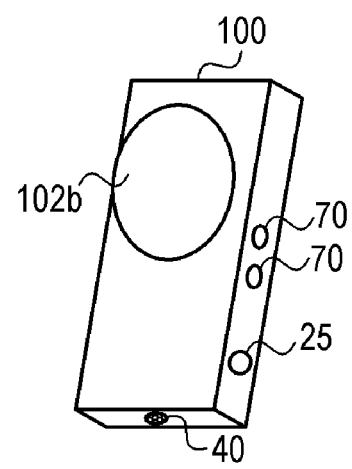

Embodiments of the present invention will be described with reference to the drawings. FIG. 1A is a front perspective view (external view) of a digital camera 100 (image apparatus). FIG. 1B is a rear perspective view (external view) of the digital camera 100. The digital camera 100 is an omnidirectional camera.

A barrier 102a is a protective window for a front camera unit of which image capturing range is a front area of the digital camera 100. The front camera unit is a wide angel camera unit of which image capturing range is a wide range on the front side of the digital camera 100 that is at least 180° vertically and horizontally, for example. A barrier 102b is a protective window for a rear camera unit of which image capturing range is a rear area of the digital camera 100. The rear camera unit is a wide angle camera unit of which image capturing range is a wide range in the rear side of the digital camera 100 that is at least 180° vertically and horizontally, for example.

A display unit 28 displays various information. A shutter button 61 is an operation unit (operation member) to instruct image capturing. A mode selecting switch 60 is an operation unit to switch various modes. A connection interface 25 is a connector to connect a connection cable to the digital camera 100, whereby the digital camera 100 is connected to an external apparatus (e.g. smartphone, personal computer, TV) via the connection cable. An operation unit 70 has various switches, buttons, dials, touch sensors or the like to receive various operations from the user. A power switch 72 is a push button to switch the power supply ON/OFF.

A light-emitting unit 21 is a light-emitting member (e.g. a light-emitting diode (LED)) that notifies the user on various states of the digital camera 100 using light-emitting patterns and light-emitting colors. A fixing unit 40 has a screw hole for a tripod, for example, and is used to install and fix the digital camera 100 to a fixture (e.g. tripod).

Figure 1C:
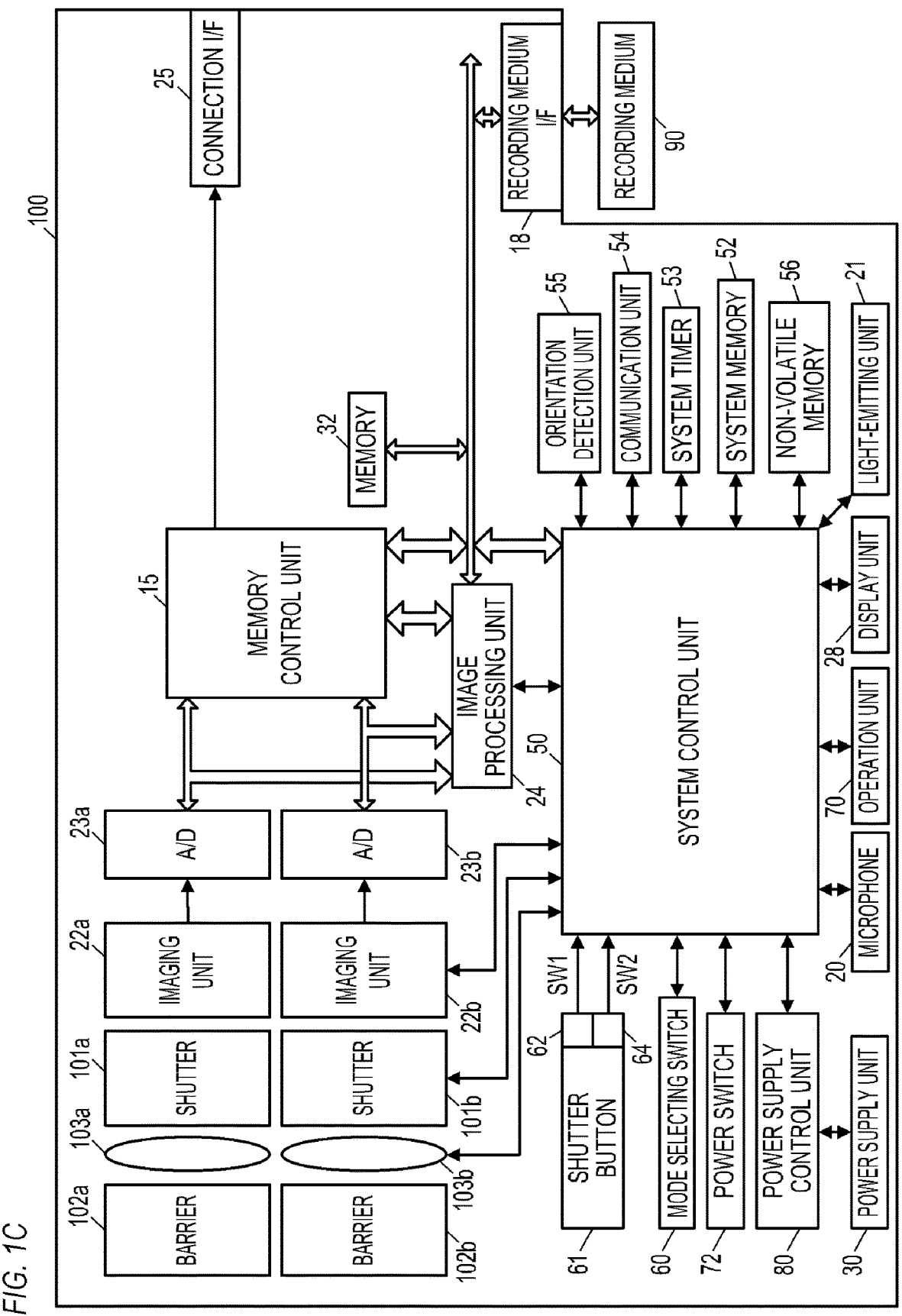
FIG. 1C is a block diagram of the digital camera.

FIG. 1C is a block diagram depicting a configuration example of the digital camera 100.

The barrier 102a covers an imaging system (e.g. an image capturing lens 103a, a shutter 101a, an imaging unit 22a) of the front camera unit, so as to prevent contamination of and damage to the imaging system. The image capturing lens 103a is a lens group including a zoom lens and a focus lens, and is a wide angle lens. The shutter 101a is a shutter which has an aperture function to adjust the incident quantity of the object light to the imaging unit 22a. The imaging unit 22a is an image pickup element (image sensor) constituted of a CCD, a CMOS element or the like to convert an optical image into an electric signal. An A/D convertor 23a converts an analog signal outputted from the imaging unit 22a into a digital signal. Instead of disposing the barrier 102a, the outer surface of the image capturing lens 103a may be exposed so that the image capturing lens 103a prevents contamination of and damage to the other components of the imaging system (e.g. shutter 101a, imaging unit 22a).

The barrier 102b covers an imaging system (e.g. an image capturing lens 103b, a shutter 101b, an imaging unit 22b) of the rear camera unit, so as to prevent contamination of and damage to the imaging system. The image capturing lens 103b is a lens group including a zoom lens and a focus lens, and is a wide angle lens. The shutter 101b is a shutter which has an aperture function to adjust the incident quantity of the object light to the imaging unit 22b. The imaging unit 22b is an image pickup element constituted of a CCD, a CMOS element or the like to convert an optical image into an electric signal. An A/D convertor 23b converts an analog signal outputted from the imaging unit 22b into a digital signal. Instead of disposing the barrier 102b, the outer surface of the image capturing lens 103b may be exposed so that the image capturing lens 103b prevents contamination of and damage to the other components of the imaging system (e.g. shutter 101b, imaging unit 22b).

A virtual reality (VR) image is captured by the imaging unit 22a and the imaging unit 22b. The VR image is an image that can be VR-displayed (displayed in display mode "VR view"). The VR image includes an omnidirectional image captured by an omnidirectional camera, and a panoramic image having an image range (effective image range) that is wider than the possible display range of the display unit. The VR image includes not only a still image but also a moving image and a live view image (image acquired from the camera in near real-time). The VR image has an image range (effective image range) equivalent to the visual field that is at most 360° in the vertical direction (vertical angle, angle from the zenith, elevation angle, depression angle, altitude angle, pitch angle), and 360° in the horizontal direction (horizontal angle, azimuth angle, yaw angle).

The VR image includes an image that has an angle of view (visual field range) wider than the angle of view that a standard camera can capture, even if the angle is less than 360° vertically and 360° horizontally, or an image that has an image range (effective image range) wider than a possible display range of the display unit. For example, an image captured by an omnidirectional camera that can capture an image of an object in a visual field (angle of view) that is 360° horizontally (horizontal angle, azimuth angle), and 210° vertically with the zenith at the center, is a type of VR image. Further, an image captured by a camera that can capture an image of an object in a visual field (angle of view) that is 180° horizontally (horizontal angle, azimuth angle) and 180° vertically with the horizontal direction at the center, is a type of VR image. In other words, an image which has an image range of a visual field that is at least) 160° (±80°) in the vertical direction and horizontal direction respectively, and which has an image range that is wider than a range that an individual can visually recognize at once, is a type of VR image.

When this VR image is VR-displayed (displayed in the display mode "VR view"), the seamless omnidirectional image can be viewed in the horizontal direction (horizontally rotating direction) by changing the orientation of the display apparatus (display apparatus that displays the VR image) in the horizontally rotating direction. In terms of the vertical direction (vertically rotating direction), the seamless omnidirectional image can be viewed in the ±105° range from above (zenith), but the range that exceeds 105° from the zenith becomes a blank region where no image exists. The VR image can be defined as "an image of which image range is at least a part of a virtual space (VR space)".

The VR display (VR view) is a display method (display mode) in which the display range, to display an image in the visual field range in accordance with the orientation of the display apparatus, out of the VR image, can be changed. To view the image wearing a head mount display (HMD), which is a display apparatus, an image in the visual field, in accordance with the orientation of the face of the user, is displayed. For example, it is assumed that an image in the visual angle (angle of view) centered at 0° in the horizontal direction (specific azimuth, such as North) and 90° in the vertical direction (90° from the zenith, that is, the horizontal direction) out of the VR image, is displayed at a certain timing. If the orientation of the display apparatus is front/back inverted (e.g. display surface is changed from facing South to facing North), the display range is changed to an image in the visual angle centered at 180° in the horizontal direction (opposite azimuth, such as South), and 90° in the vertical direction (horizontal direction) out of the same VR image. In the case where the user views the image while wearing an HMD, the image displayed on the HMD changes from an image to the North to an image to the South if the user turns their face from North to South (in other words, if the user turns back). By this VR display, the user can visually experience the sensation (sense of immersion) as if they are actually at the spot in the VR image (VR space). A smartphone mounted on the VR goggles (head mount adapter) can be regarded as a type of HMD.

The method of displaying the VR image is not limited to the above description. The display range may be moved (scrolled) in accordance with the user operation on a touch panel, direction button or the like, instead of by changing the orientation. When the VR image is displayed (when the display mode is "VR view"), the display range may be changed not only by changing the orientation, but also by a touch move on the touch panel, a drag operation by mouse, pressing the direction button and the like.

An image processing unit 24 performs a predetermined processing, such as pixel interpolation, resizing (e.g. zoom out), and color conversion, on the data from the A/D convertor 23a and the A/D convertor 23b, or the data from the memory control unit 15. The image processing unit 24 also performs a predetermined arithmetic processing using captured image data. A system control unit 50 performs exposure control and distance measurement control based on the arithmetic result acquired by the image processing unit 24. Thereby the through the lens (TTL) type autofocus (AF) processing, auto exposure (AE) processing, pre-flash emission (EF) processing and the like are performed. The image processing unit 24 also performs a predetermined arithmetic processing using the captured image data, and performs TTL type auto white balance (AWB) processing based on the acquired arithmetic result. Further, the image processing unit 24 performs basic image processing on the two images (two fish eye images; two wide angle images) acquired from the A/D convertor 23a and the A/D convertor 23b, and performs image connection processing to combine the two images on which the basic processing was performed, so as to generate a single VR image. Furthermore, the image processing unit 24 performs image extraction processing, zooming processing, distortion correction and the like to VR-display the VR image when the image is VR-displayed in live view or when reproduced, and performs rendering to write the processing result in a VRAM of a memory 32.

In the image connection processing, the image processing unit 24 uses one of the two images as a reference image and the other as a comparative image, calculates the amount of deviation between the reference image and the comparative image for each area by pattern matching processing, and detects a connection position to connect the two images based on the amount of deviation in each area. Considering the detected connection position and the lens characteristic of each optical system, the image processing unit 24 corrects the distortion of each image by the geometric conversion, so as to convert each image into an image in an omnidirectional format (omnidirectional image format). Then the image processing unit 24 combines (blends) the two images in the omnidirectional format, so as to generate one omnidirectional image (VR image). The generated omnidirectional image is an image based on the equidistant cylindrical projection, and the position of each pixel of the omnidirectional image can be corresponded to the coordinates on the surface of a sphere (VR space).

The output data from the A/D convertors 23a and 23b are written in the memory 32 via the image processing unit 24 and the memory control unit 15, or via the memory control unit 15 without passing through the image processing unit 24. The memory 32 stores image data, which is acquired by the imaging units 22a and 22b and converted into digital data by the A/D convertors 23a and 23b, and image data that is outputted to an external display via the connection interface 25. The memory 32 has a storage capacity that is sufficient to store a predetermined number of still images, or a predetermined time of moving images and sound data.

The memory 32 also functions as a memory for image display (video memory). The data for image display, which is stored in the memory 32, can be outputted to an external display via the connection interface 25. If the VR images, which were captured by the imaging units 22a and 22b, processed by the image processing unit 24 and stored in the memory 32, are sequentially transferred to and displayed on an external display, and this digital camera can function as an electronic view finder and perform live view display (LV display). Hereafter the image displayed by the live view display is called a "live view image (LV image"). Further, to perform the live view display (remote LV display), the VR images stored in the memory 32 may be transferred to a wirelessly-connected external apparatus (e.g. smartphone) via the communication unit 54, and displayed on the external apparatus side.

A non-volatile memory 56 is a memory that functions as an electrically erasable and recordable recording medium, such as EEPROM. In the non-volatile memory 56, constants, programs and the like for operation of the system control unit 50 are recorded. "Programs" here refer to computer programs that execute various types of processing.

The system control unit 50 is a control unit that includes at least one processor or circuit, and controls the digital camera 100 in general. The system control unit 50 implements each processing by executing a program recorded in the above mentioned non-volatile memory 56. The system memory 52 is a RAM, for example, and in the system memory 52, constants and variables for the operation of the system control unit 50 and programs read from the non-volatile memory 56 are developed. The system control unit 50 also controls display by controlling the memory 32, the image processing unit 24, the memory control unit 15 and the like. A system timer 53 is a timer that measures the time used for various controls and the time of internal clocks.

The mode selecting switch 60, the shutter button 61, the operation unit 70 and the power switch 72 are used to input various operation instructions to the system control unit 50.

The mode selecting switch 60 switches the operation mode of the system control unit 50 to one of a still image recording mode, a moving image capturing mode, a reproduction mode, a communication connecting mode and the like. The still image recording mode includes an auto image capturing mode, an auto scene determination mode, a manual mode, an aperture priority mode (Av mode), a shutter speed priority mode (Tv mode) and a program AE mode. Various scene modes, to set image capturing for each image capturing scene, and a custom mode are also included. The user can directly select one of these modes using the mode selecting switch 60. The user may select switching to an image capturing mode list screen first, using the mode selecting switch 60, then the user may select one of the plurality modes displayed on the display unit 28 using another operation member. The moving image capturing mode may include a plurality of modes in the same manner.

The shutter button 61 includes a first shutter switch 62 and a second shutter switch 64. The first shutter switch 62 is turned ON in the middle of the operation of the shutter button 61, that is, in the half-depressed state (image capturing preparation instruction), and generates a first shutter switch signal SW1. By the first shutter switch signal SW1, the system control unit 50 starts the image capturing preparation operation, such as the auto focus (AF) processing, the auto exposure (AE) processing, the auto white balance (AWB) processing, and the pre-flash emission (EF) processing. The second shutter switch 64 is turned ON when the operation of the shutter button 61 completes, that is, in the fully-depressed state (image capturing instruction), and generates a second shutter switch signal SW2. By the second shutter switch signal SW2, the system control unit 50 starts a series of operations of the image capturing processing, from reading signals from the imaging units 22a and 22b to writing the image data to a recording medium 90.

The shutter button 61 is not limited to an operation member that can perform a two-step operation (half-depression and full-depression), but may be an operation member that can perform only a one step of depression. In this case, the image capturing preparation operation and the image capturing processing are performed continuously by a one-step depression. This is the same as the case of fully depressing the shutter button that can perform both half depression and full depression (case where the first shutter switch signal SW1 and the second shutter switch signal SW2 are generated almost simultaneously).

The operation unit 70 functions as various functional buttons that perform the functions assigned for each scene, by selecting various functional icons and options displayed on the display unit 28. The functional buttons include: an end button, a return button, an image forward button, a jump button, a preview button and an attribute change button. For example, when the menu button is depressed, a menu screen, that allows various settings, is displayed on the display unit 28. The user operates the operation unit 70 while viewing the menu screen displayed on the display unit 28, whereby various settings can be performed intuitively.

The power switch 72 is a push button to switch ON/OFF of the power supply. A power supply control unit 80 includes a battery detection circuit, a DC-DC convertor, and a switch circuit to select a block to be energized, so as to detect whether the battery is installed, a type of the battery, a residual amount of battery power and the like. The power supply control unit 80 also controls the DC-DC convertor based on the detection result and the instructions of the system control unit 50, and supplies the required voltage to each components, including the recording medium 90, for a required period of time. A power supply unit 30 includes: a primary battery (e.g. alkali battery, lithium battery), a secondary battery (e.g. NiCd battery, an NIMH battery, an Li battery), and an AC adapter.

A recording medium interface 18 is an interface with the recording medium 90 (e.g. memory card hard disk). The recording medium 90 is a storage unit (e.g. memory card) to record captured images, and is constituted of a semiconductor memory, an optical disk, a magnetic disk or the like. The recording medium 90 may be an exchangeable recording medium that is detachable from the digital camera 100 or may be a recording medium embedded in the digital camera 100.

A communication unit 54 transmits/receives image signals and sound signals to/from an external apparatus that is connected wirelessly or via cable. The communication unit 54 can also be connected to a wireless local area network (LAN) or Internet. The communication unit 54 can transmit images captured by the imaging units 22a and 22b (including LV images) or images recorded in the recording medium 90, and can receive images and various other information from an external apparatus.

An orientation detection unit 55 detects an orientation of the digital camera 100 with respect to the direction of gravity. Based on the orientation detected by the orientation detection unit 55, it can be determined whether the images captured by the imaging units 22a and 22b are images captured when the digital camera 100 is held in the horizontal position, or images captured when the digital camera 100 is held in the vertical position. It can also be determined to what degree the digital camera 100 was inclined in the three axis directions (rotation directions), that is, the yaw direction, the pitch direction and the roll direction, when the images were captured by the imaging units 22a and 22b. The system control unit 50 can add the orientation information in accordance with the orientation detected by the orientation detection unit 55 to the image file of the VR image captured by the imaging units 22a and 22b, or can rotate the image (adjust the orientation of the image so as to correct the inclination (zenith correction)) and record the rotated image. One or a set of a plurality of sensors, out of the acceleration sensor, gyro sensor, geo magnetic sensor, azimuth sensor, altitude sensor and the like may be used as the orientation detection unit 55. Using the acceleration sensor, gyro sensor, azimuth sensor and the like, which constitute the orientation detection unit 55, the movement of the digital camera 100 (e.g. pan, tilt, elevate, still) can be detected.

A microphone 20 is a microphone that collects sound around the digital camera 100, that is recorded as sound of the VR image which is a moving image (VR moving image). A connection interface 25 is a connection plug to which an HDMI® cable, USB cable or the like is connected so as to transmit or receive images to/from an external apparatus.

Figure 2A:
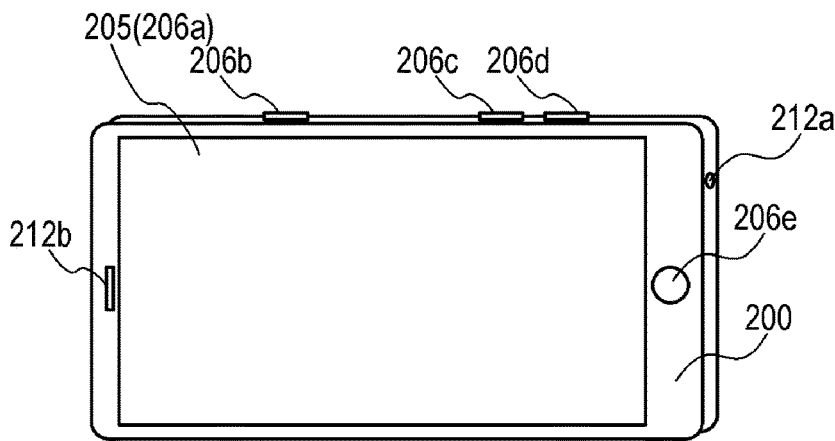
FIG. 2A is an external view of an electronic apparatus.

FIG. 2A is an external view of an electronic apparatus 200, which is a type of display control apparatus. The electronic apparatus 200 is a display apparatus, such as a smartphone. A display 205 is a display unit that displays images and various information. The display 205 is integrated with a touch panel 206a, so that the touch operation on the display surface of the display 205 can be detected. The electronic apparatus 200 can VR-display a VR image (VR content) on the display 205. An operation unit 206b is a power button which receives operation to switch the ON/OFF of the power supply of the electronic apparatus 200. An operation unit 206c and an operation unit 206d are volume buttons to increase/decrease the volume of the sound outputted from a speaker 212b, an earphone and external speaker connected to the sound output terminal 212a. An operation unit 206e is a home button to display a home screen on the display 205. The sound output terminal 212a is an earphone jack, which is a terminal to output sound signals to an earphone, an external speaker or the like. The speaker 212b is a built-in speaker to output sound.

Figure 2B:
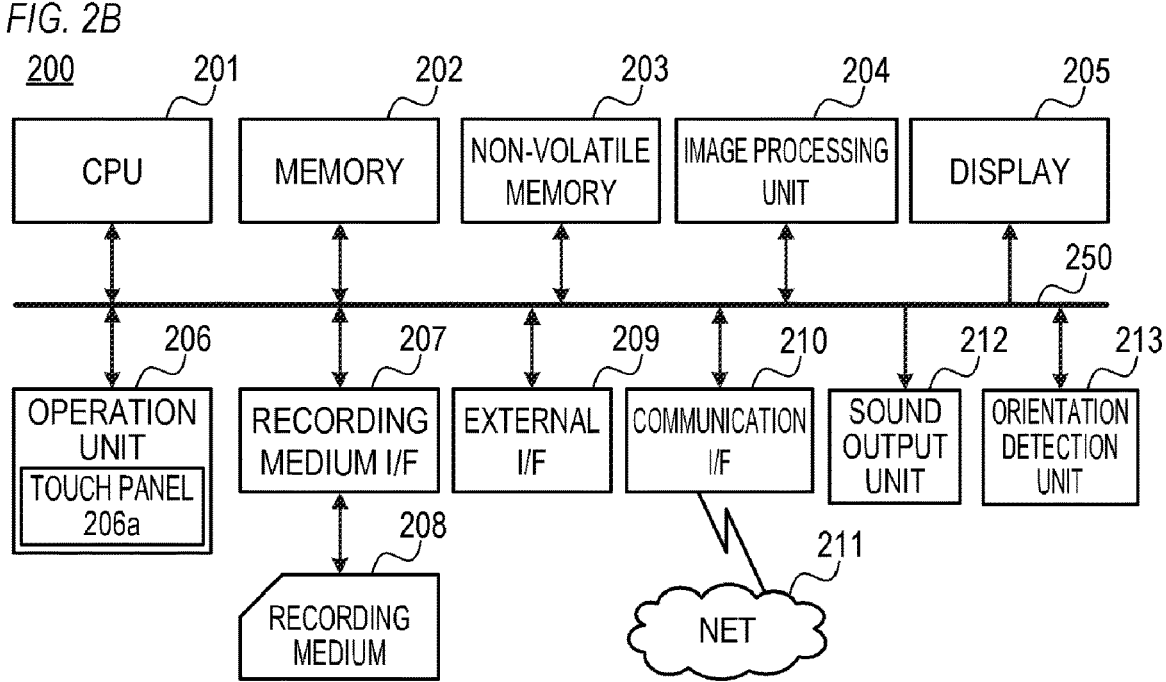
FIG. 2B is a block diagram of the electronic apparatus.

FIG. 2B is a block diagram depicting a configuration example of the electronic apparatus 200. A CPU 201, a memory 202, a non-volatile memory 203, an image processing unit 204, a display 205, an operation unit 206, a recording medium interface 207, an external interface 209 and a communication interface 210 are connected to an internal bus 250. The sound output unit 212 and an orientation detection unit 213 are also connected to the internal bus 250. Each unit connected to the internal bus 250 is configured such that data can be exchanged with other units via the internal bus 250.

The CPU 201 is a control unit that controls the electronic apparatus 200 in general, and includes at least one processor or circuit. The memory 202 is a RAM (e.g. volatile memory using a semiconductor element). The CPU 201 controls each unit of the electronic apparatus 200 using the memory 202 as a work memory, in accordance with the program stored in the non-volatile memory 203, for example. The non-volatile memory 203 stores such data as image data and sound data, and various programs for the CPU 201 to operate. The non-volatile memory 203 is a flash memory or a ROM, for example.

The image processing unit 204 performs various image processing on the images stored in the non-volatile memory 203 and the recording medium 208, the image signals acquired via the external interface 209, the images acquired via the communication interface 210 and the like, based on the control of the CPU 201. The image processing performed by the image processing unit 204 include: the A/D conversion processing, D/A conversion processing, encoding processing of image data, compression processing, decoding processing, zooming processing (resizing), noise reduction processing and color conversion processing. The image processing unit 204 also performs various types of image processing (e.g. panoramic development, mapping processing, conversion) on a VR image, which is an omnidirectional image or a wide range image, which is not an omnidirectional image but an image having a wide range. The image processing unit 204 may be configured by dedicated circuit blocks to perform a specific image processing. Depending on the type of image processing, the CPU 201 may perform the image processing in accordance with a program, without using the image processing unit 204.

The display 205 displays images and a graphical user interface (GUI) screen constituting GUI based on the control of the CPU 201. The CPU 201 generates display control signals in accordance with the program, and controls each unit of the electronic apparatus 200 so as to generate image signals to display the images on the display 205, and output the image signals to the display 205. Based on the generated outputted image signals, the display 205 displays the image. The electronic apparatus 200 may include only the configuration up to the interface to output the image signals for the display 205 to display the images, and the display 205 may be an external monitor (e.g. TV, HMD).

The operation unit 206 is an input device to receive user operation, which includes a text information input device (e.g. keyboard), a pointing device (e.g. mouse, touch panel), buttons, dials, a joystick, a touch sensor and a touch pad. In this embodiment, the operation unit 206 includes the touch panel 206a, and operation units 206b, 206c, 206d and 206e.

To the recording medium interface 207, a recording medium 208 (e.g. memory card, CD, DVD) can be removably attached. Based on the control of the CPU 201, the recording medium interface 207 reads data from the attached recording medium 208, or writes data to the recording medium 208. The recording medium 208 is a storage unit that stores such data as images to be displayed on the display 205. The external interface 209 is an interface that is connected with an external apparatus via a wired cable (such as a USB cable) or wirelessly, and inputs/outputs image signals and sound signals (performs data communication). The communication interface 210 is an interface to transmit/receive various data including files and commands (to perform data communication) by communicating with an external apparatus via the Internet 211 or the like.

The sound output unit 212 outputs the sound of a moving image or music data reproduced in the electronic apparatus 200, operation tones, ring tones, various notification tones and the like. The sound output unit 212 includes the sound output terminal 212a to connect an earphone and the like, and the speaker 212b. The sound output unit 212 may output the sound data to an external speaker via wireless communication or the like.

The orientation detection unit 213 detects the orientation (inclination) of the electronic apparatus 200 with respect to the direction of gravity, and the orientation of the electronic apparatus 200 with respect to each axis in the yaw direction, pitch direction and roll direction, and notifies the orientation information to the CPU 201. Based on the orientation detected by the orientation detection unit 213, it can be determined whether the electronic apparatus 200 is held horizontally or vertically, and whether the electronic apparatus 200 turns up or down, or in a diagonal orientation. It can also be detected whether the electronic apparatus 200 is inclined in the rotation directions (e.g. yaw direction, pitch direction, roll direction), the angle of the inclination, and whether the electronic apparatus 200 rotated in the rotation direction. One or a combination of sensors (e.g. acceleration sensor, gyro sensor, geo magnetic sensor, azimuth sensor, altitude sensor) may be used as the orientation detection unit 213.

As mentioned above, the operation unit 206 includes a touch panel 206a. The touch panel 206a is an input device, which is configured as a plane superimposed on the display 205, so that the coordinate information corresponding to the contacted position is outputted. The CPU 201 can detect the following operation performed on the touch panel 206a or the state thereof.

A finger or pen which is not touching the touch panel 206a touches the touch panel 206a, that is, touch is started (hereafter Touch-Down)

A finger or pen is touching the touch panel 206a (hereafter Touch-On)

A finger or pen is moving in the touching state on the touch panel 206a (hereafter Touch-Move)

A finger or pen, which is touching the touch panel 206a, is released from the touch panel 206a, that is, touch is ended (hereafter Touch-Up)

Nothing is touching the touch panel 206a (hereafter Touch-Off)

Pressing the touch panel 206a at a pressing force that is stronger than a first threshold and weaker than a second threshold (hereafter this state is called Peek, and an operation to generate Peek is called "peek operation").

Pressing the touch panel 206a at a pressing force that is stronger than the second threshold (hereafter this state is called Pop, and the operation to generate Pop is called "pop operation").

The operation to press the touch panel 206a at the pressing force of the second threshold may be detected as the peek operation or as the pop operation. When Touch-Down is detected, Touch-On is also detected at the same time. Unless Touch-Up is detected after Touch-Down, Touch-On is normally detected continuously. When Touch-Move is detected as well, Touch-On is detected at the same time. Even if Touch-On is detected, Touch-Move is not detected unless the touch position is moving. Touch-Off is detected when Touch-Up of all fingers and pen are detected.

These operations, states and coordinates of the positions of the finger(s) or pen touching the touch panel 206a are notified to the CPU 201 via the internal bus, and based on the notified information, the CPU 201 determines the kind of operation (touch operation) that was performed on the touch panel 206a. For Touch-Move, the CPU 201 can also determine the moving direction of the finger or pen moving on the touch panel 206a, based on the change of the positional coordinates, for the vertical components and the horizontal components on the touch panel 206a respectively. If Touch-Move is detected for at least a predetermined distance, the CPU 201 determines that the slide operation was performed.

An operation of quickly moving a finger on the touch panel 206a for a certain distance in the touched state and releasing the finger is called "flick". In other words, flick is an operation of moving and releasing the finger rapidly on the touch panel 206a. If Touch-Move is detected for at least a predetermined distance at a predetermined speed or faster, and Touch-Up is detected thereafter, the CPU 201 then determines that flick was performed (determines that flick was performed after the slide operation).

Further, a touch operation of touching a plurality of points (e.g. two points) simultaneously and moving these touch positions closer together is called "Pinch-In", and a touch operation of moving these touch positions further apart is called "Pinch-Out". Pinch-In and Pinch-Out are collectively called a pinch operation (or simply "pinch"). For the touch panel 206a, various types of touch panels may be used, such as a resistive film type, a capacitive type, a surface acoustic wave type, an infrared type, an electromagnetic induction type, an image recognition type and an optical sensor type. There is a type of detecting touch when the touch panel is actually contacted, and a type of detecting touch when a finger or pen approaches the touch panel, but either type may be used.

Figure 2C:
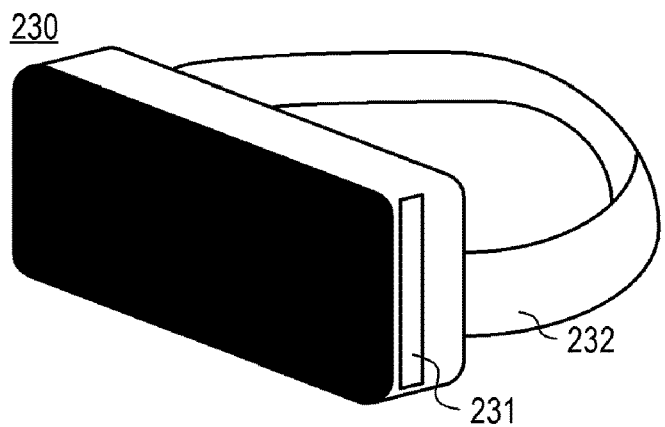
FIG. 2C is an external view of VR goggles.

FIG. 2C is an external view of VR goggles (head mount adapter) 230 in which the electronic apparatus 200 can be mounted. The electronic apparatus 200 can be used as a head mount display by being mounted on the VR goggles 230. An insertion slot 231 is a slot to insert the electronic apparatus 200. The entire electronic apparatus 200 can be inserted into the VR goggles 230 such that the display surface of the display 205 faces a head band 232 which secures the VR goggles 230 to the head of the user (that is, faces the user side). The user, in the state of wearing the VR goggles 230, (in which the electronic apparatus 200 is mounted), on their head, can view the display 205 without holding the electronic apparatus 200 by hand. In this case, the orientation of the electronic apparatus 200 changes if the user moves their head or entire body. The orientation detection unit 213 detects the change of the electronic apparatus 200 in this case, and the CPU 201 performs processing for the VR display based on this change of orientation. In this case, the orientation detection unit 213, detecting the orientation of the electronic apparatus 200, is equivalent to detecting the orientation of the head of the user (direction in which the line of sight of the user is directed). The electronic apparatus 200 itself may be an HMD which can be mounted without the VR goggles.

Figure 3:
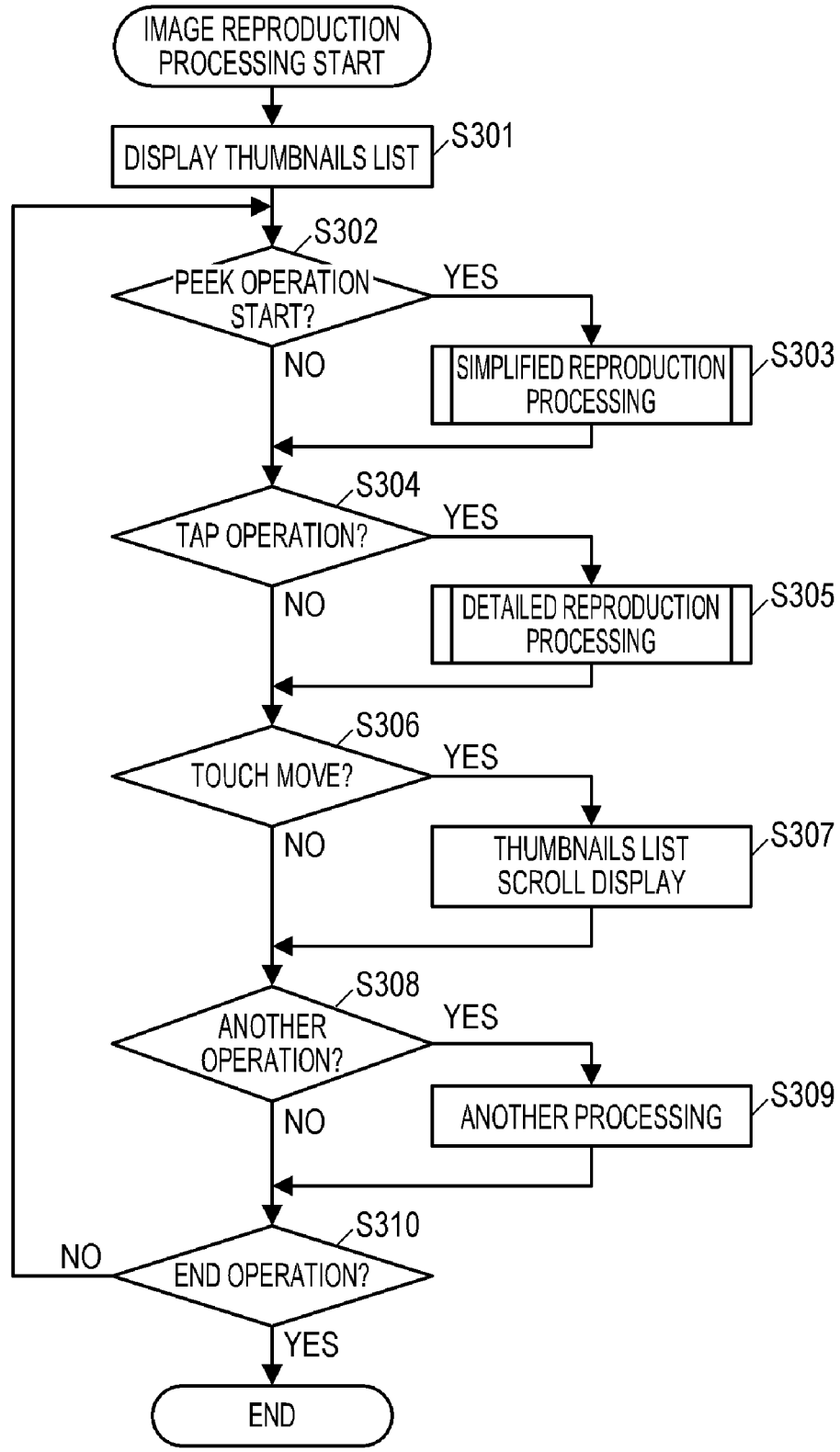
FIG. 3 is a flow chart of an image reproduction processing.

FIG. 3 is a flow chart depicting an example of the image reproduction processing of the electronic apparatus 200. This processing is implemented by the CPU 201 developing the program recorded in the non-volatile memory 203 in the memory 202, and executing the program. When an application to check or edit an image (image data; content) stored in the recording medium 208 is started in a state where the electronic apparatus 200 is turned on, the CPU 201 initializes the flags, controls variables and the like, and starts the image reproduction processing in FIG. 3.

In step S301, based on the images stored in the recording medium 208, the CPU 201 displays a list screen of the images stored in the recording medium 208 on the display 205. FIG. 6A is an example of the list screen (thumbnails list 601). In the thumbnails list 601, a plurality of thumbnails 602 are displayed side-by-side as items corresponding to a plurality of images respectively. In the thumbnails 602 of the VR image (VR content), a VR icon 603 is superimposed and displayed to indicate the difference from the thumbnails 602 of the normal image (non-VR image).

In step S302, the CPU 201 determines whether peek operation on the touch panel 206a started. Processing advances to step S303 if determined that the peek operation started, or to step S304 if not.

In step S303, the CPU 201 performs a simplified reproduction processing for the user to simply check an image corresponding to the thumbnail displayed at a position where the peek operation is performed. The simplified reproduction processing will be described in detail later with reference to FIG. 4.

In step S304, the CPU 201 determines whether the tap operation (a pair of Touch-Down and Touch-Up performed in a short time) was performed on the touch panel 206a. Processing advances to step S305 if determined that the tap operation was performed, or to step S306 if not.

In step S305, the CPU 201 performs detailed reproduction processing for the user to closely check the image corresponding to the thumbnail displayed at a position where the tap operation is performed. The detailed reproduction processing will be described in detail later with reference to FIG. 5.

In step S306, the CPU 201 determines whether Touch-Move was performed on the touch panel 206a. Processing advances to step S307 if determined that Touch-Move was performed, or to step S308 if not.

In step S307, the CPU 201 scrolls a plurality of thumbnails (scroll display of thumbnails list) in accordance with Touch-Move (moving distance and moving direction of Touch position) in step S306. Thereby at least a part of the thumbnails that are not displayed are displayed (at least a part of the thumbnails located outside the screen of the display 205 move onto the screen). On the other hand, at least a part of the displayed thumbnails are no longer displayed (at least a part of the thumbnails located within the screen of the display 205 move outside the screen).

In step S308, the CPU 201 determines whether another operation was performed on the operation unit 206. Processing advances to step S309 if determined that another operation was performed, or to step S310 if not.

In step S309, the CPU 201 performs another processing (a processing in accordance with the operation in step S308). The processing in step S309 is, for example, a selection of an image or a rearrangement of images.

In step S310, the CPU 201 determines whether end operation was performed on the operation unit 206. The image reproduction processing ends if determined that the end operation was performed, or processing returns to step S302 if not.

Figure 4:
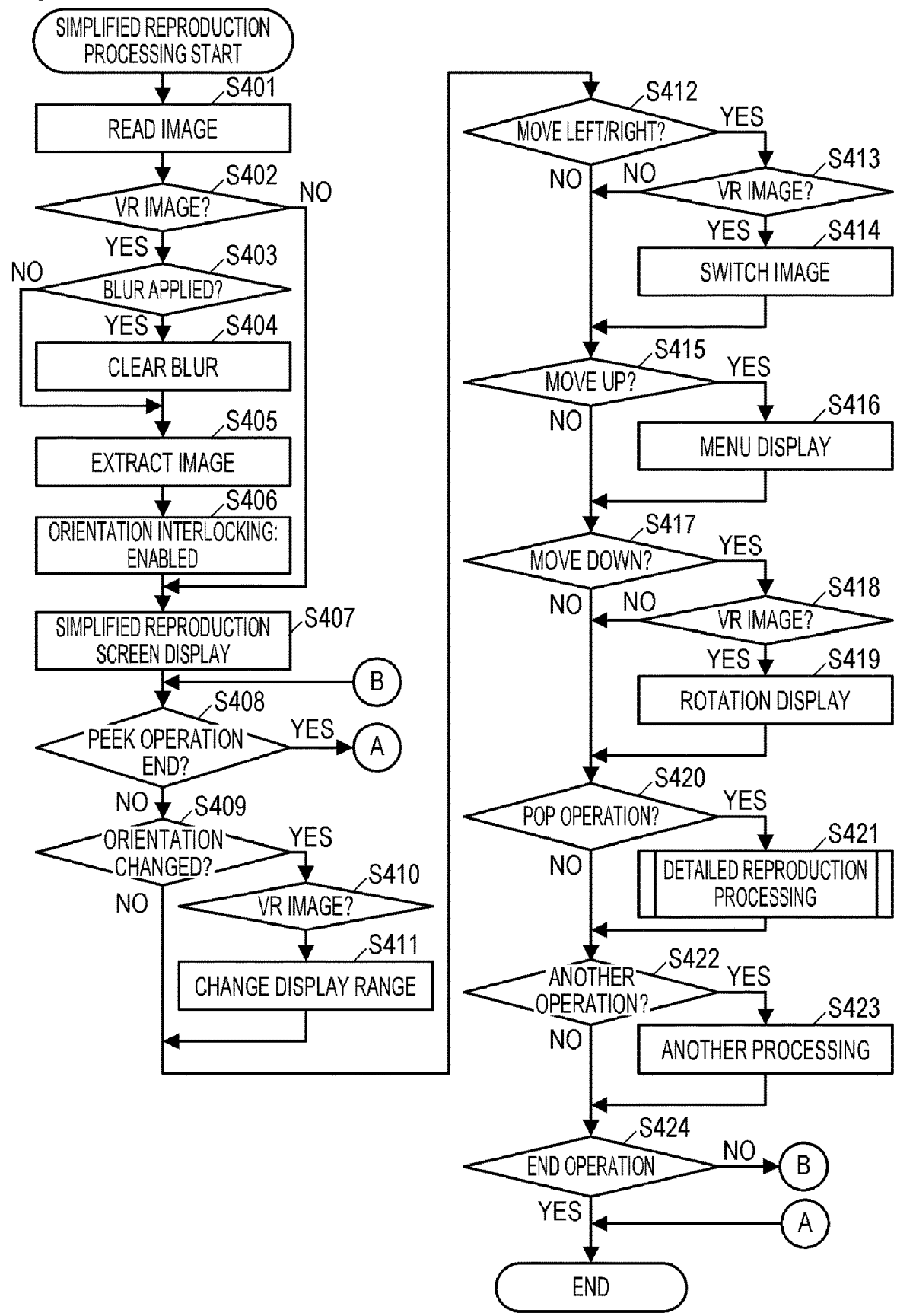
FIG. 4 is a flow chart of a simplified reproduction processing.

FIG. 4 is a flow chart depicting an example of the simplified reproduction processing (step S303 in FIG. 3) of the electronic apparatus 200. This processing is implemented by the CPU 201 developing the program recorded in the non-volatile memory 203 in the memory 202, and executing the program.

In step S401, the CPU 201 reads an image corresponding to the thumbnail displayed at the position where the peek operation was performed (step S303 in FIG. 3), from the recording medium 208.

In step S402, the CPU 201 determines whether the image read in step S401 is a VR image. Processing advances to step S403 if determined that the image is a VR image, or to step S407 if not.

In step S403, the CPU 201 determines whether the VR image read in step S401 is an edited VR image. In concrete terms, the CPU 201 determines whether the blur effect is applied to the VR image read in step S401. Processing advances to step S404 if determined that the VR image is an edited VR image, that is, a VR image to which the blur effect is applied, or to step S405 if not. The editing may be performed by the electronic apparatus 200 or by a different apparatus.

In step S404, the CPU 201 temporarily clears the blur effect applied to the VR image read in step S401. Thereby the VR image becomes a state before editing.

In step S405, the CPU 201 acquires (extracts) a part of the VR image read in step S401. For example, a thumbnail of the VR image indicates a part of this VR image, and in step S405, a portion corresponding to the thumbnail is acquired from the VR image. In the case where the blur effect is cleared in step S404, a part of the VR image after the blur effect was cleared is acquired.

In step S406, the CPU 201 enables an orientation interlocking mode, in which the orientation of the electronic apparatus 200, detected by the orientation detection unit 213, is used to determine the display range of the VR image.

In step S407, the CPU 201 displays the simplified reproduction screen, which includes the image read in step S401, on the display 205. In the case of a non-VR image (normal image), the entire image read in step S401 is displayed, and in the case of the VR image, an image acquired in step S405 (a part of the VR image) is displayed. In other words, in the case of the VR image, a part of the image range (an image range, or a range that includes the image range (valid image range) and non-image range (invalid image range)) is displayed as the display image.

FIG. 6B is an example of the simplified reproduction screen of the non-VR image. When the user performs the peek operation by hand 604 on a thumbnail corresponding to a non-VR image (FIG. 6A), the display screen changes from the list screen (thumbnails list 601) to the simplified reproduction screen in FIG. 6B. In the simplified reproduction screen in FIG. 6B, the thumbnails list 601 (a plurality of thumbnails 602) is darkened or blurred generally, so as to be obscured in the background in the display (shadow display 605). Then the non-VR image 606 (entire non-VR image) that was read is superimposed and displayed on the thumbnails list 601 of the shadow display 605. Further, the upward direction icon 607, to indicate to the user that the menu display can be performed by Touch-Move in the upward direction, is displayed.

Figure 6H:
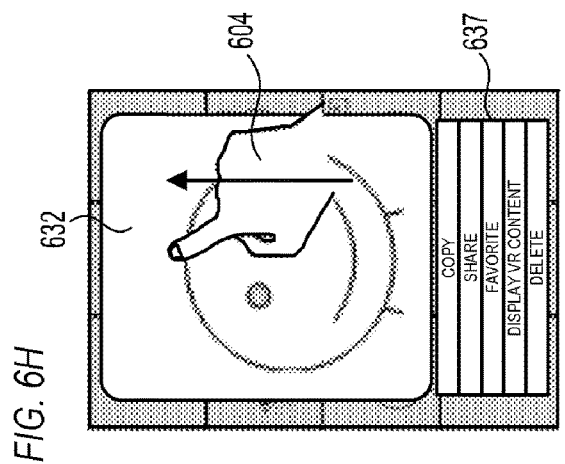
Figure 6K:
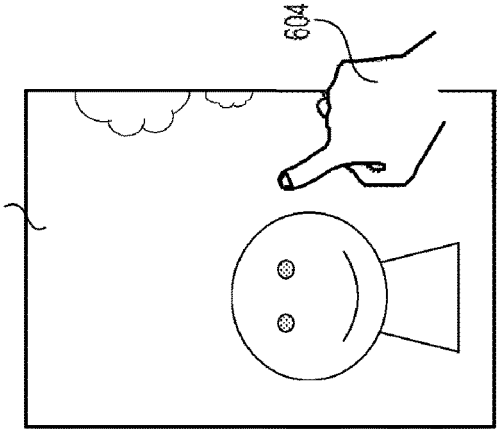
Figure 6G:
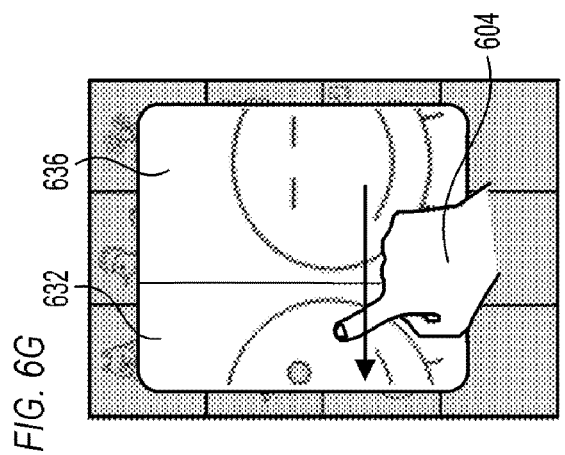
Figure 6J:
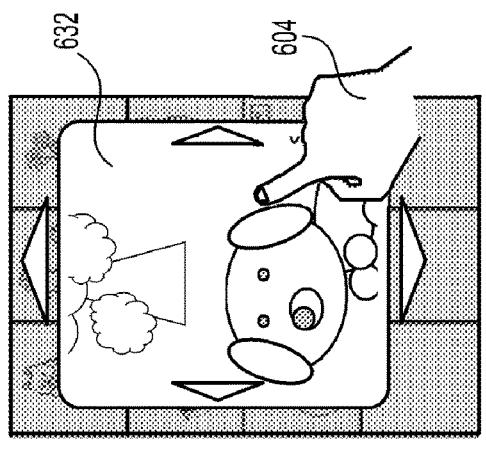
Figure 6F:
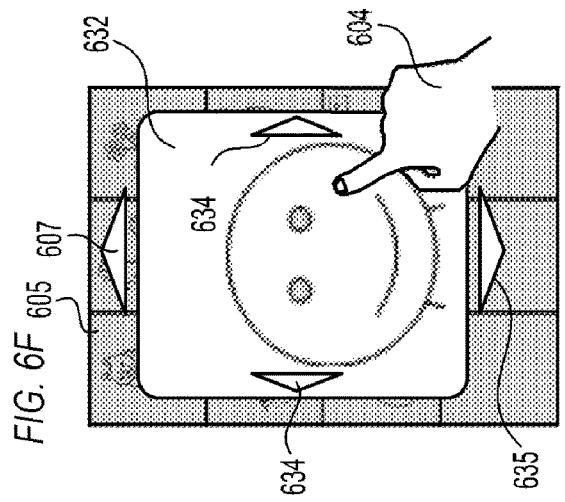

FIG. 6F is an example of the simplified reproduction screen of a VR image. Here an omnidirectional image 630 illustrated in FIG. 6E will be described as an example. When the user performs the peek operation by hand 604 on the thumbnail corresponding to the VR image, the display screen changes from the list screen (thumbnails list 601) to the simplified reproduction screen in FIG. 6F. In the simplified reproduction screen in FIG. 6F as well, the shadow display 605 of the thumbnails list 601 is performed. In the simplified reproduction screen in FIG. 6F, however, a partial image 632 (a part of the read image), and not the entire read image, is superimposed and displayed on the thumbnails list 601 of the shadow display 605, unlike the simplified reproduction screen in FIG. 6B. If the entire read VR image is displayed, the display magnification of the VR image is low, and the content of the VR image is difficult to check. In other words, the VR image cannot be browsed (checked) at high browsing operability. If the display range is limited to a part of the VR image, the display magnification of the VR image can be increased, and browsing operability of the VR image can be improved. In the simplified reproduction screen in FIG. 6F, the left/right direction icons 634 and the downward direction icon 635 are displayed beside the upward direction icon 607.

In step S408, the CPU 201 determines whether the peek operation on the touch panel 206a ended. The simplified reproduction processing ends if determined that the peek operation ended, or processing advances to S409 if not.

In step S409, the CPU 201 determines whether the orientation detection unit 213 detected the change of orientation of the electronic apparatus 200. Processing advances to step S410 if determined that the change of orientation is detected, or to step S412 if not.

In step S410, the CPU 201 determines whether the image read in step S401 is a VR image. Processing advances to step S411 if determined that the image is a VR image, or to step S412 if not. Instead of determining whether the image is a VR image or not for a plurality of times, the determination result in step S402 may be used here.

In step S411, the CPU 201 changes the display range of the VR image (range displayed as the partial image 632) in accordance with the change of orientation detected in step S410. Thereby the entire image range of the VR image can be displayed and checked. FIG. 6J is an example of the state after the display range is changed in accordance with the change of orientation. For example, if the electronic apparatus 200 is moved in the direction of the arrow 639 (FIG. 6J), the range displayed as the partial image 632 changes from the range in FIG. 6F to the range in FIG. 6J in accordance with the moving direction and the moving distance of the electronic apparatus 200.

The step S406 and steps S409 to S411 may be omitted, so that the display range of the VR image is not changed in accordance with the change of orientation or the like. In this case, if the image read in step S401 is a VR image, a part of the image range of this VR image is extracted and displayed.

The thumbnail corresponding to the VR image may be zoomed in and displayed without performing the extraction.

In step S412, the CPU 201 determines whether a horizontal move (Touch-Move in horizontal direction) was performed on the touch panel 206a. Processing advances to step S413 if determined that the horizontal move was performed, or to step S415 if not.

In step S413, the CPU 201 determines whether the image read in step S401 is a VR image. Processing advances to step S414 if determined that the image is a VR image, or to step S415 if not.

In step S414, the CPU 201 switches an image displayed on the screen of the display 205 from the current image to another image in accordance with the horizontal move in step S412. For example, a sequence of a plurality of the images stored in the recording medium 208 is predetermined, and an image that is displayed is switched from the current image to a previous or subsequent image in accordance with the predetermined sequence. FIG. 6G is an example of switching of images in accordance with Touch-Move in the left direction. If Touch-Move in the left direction is performed, the image that is displayed is switched from the current partial image 632 of the VR image to the subsequent partial image 636 of the VR image. The display size of a thumbnail is so small that it is difficult to check the difference of the images, particularly if the images are VR images. By the processing in step S414, a plurality of images can be compared in a state where the display sizes are large and the display magnification is higher, that is, browsing operability improves.

In FIG. 6G, in order to prevent an operation error caused by Touch-Move in another direction, no icons (items) that indicate a direction are displayed, and Touch-Move in another direction is disabled. During the execution of processing in accordance with Touch-Move, no icons that indicate a direction may be displayed, and Touch-Move in another direction may be disabled. This step, however, may be omitted. In other words, during the execution in accordance with Touch-Move, icons that indicate a direction may be displayed, and Touch-Move in another direction may be enabled.

In step S415, the CPU 201 determines whether Move-Up (Touch-Move in upward direction) was performed on the touch panel 206a. Processing advances to step S416 if determined that Move-Up was performed, or to step S417 if not.

In step S416, the CPU 201 displays a menu, to perform various operations related to the image, on the screen of the display 205 in accordance with Move-Up in step S415. FIG. 6C indicates a state after the menu 607 is displayed in accordance with Move-Up on the simplified reproduction screen (simplified reproduction screen of non-VR image) in FIG. 6B. FIG. 6H indicates a state after the menu 637 is displayed in accordance with Move-Up on the simplified reproduction screen (simplified reproduction screen of VR image) in FIG. 6F. If Move-Up is performed, the non-VR image 606 and the partial image 632 moves upward, and the menu 607 or 637 is displayed in the lower part of the screen. Using the menu 607 or 637, the user can perform such operations as copying, rating and deleting an image.

The menus 607 and 637 may be the same or different. In other words, the items that can be selected in the menu may be changed depending on whether the currently displayed image is a VR image or not. For example, in the case of a VR image, an item to switch the screen to the thumbnails list of only the VR images (item "display VR content" in FIG. 6H) may be disposed.

In step S417, the CPU 201 determines whether Move-Down (Touch-Move in downward direction) was performed on the touch panel 206a. Processing advances to step S418 if determined Move-Down was performed, or to step S420 if not.

In step S418, the CPU 201 determines whether the image read in step S401 is a VR image. Processing advances to step S419 if determined that the image is a VR image, or to step S420 if not.

Figure 6I:
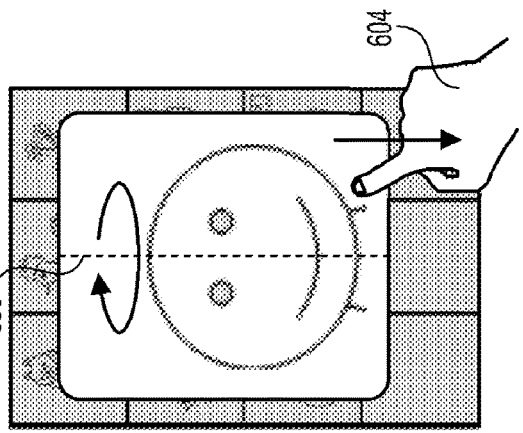

In step S419, the CPU 201 changes the display range of the VR image in accordance with Move-Down (moving distance of touch position) in step S417, so that the VR image read in step S401 rotates around the zenith axis (axis in parallel with the direction to the zenith in the VR space). Thereby the image around the zenith axis can be displayed and checked. FIG. 6I is an example of a state where the VR image rotates around the zenith axis 638 in accordance with Move-Down. If the blur effect was cleared in step S404, the display range is changed so that the VR image after the blur effect was cleared rotates.

In step S420, the CPU 201 determines whether the pop operation was performed on the touch panel 206a. Processing advances to step S421 if determined that the pop operation was performed, or to step S422 if not.

In step S421, the CPU 201 performs the detailed reproduction processing. The detailed reproduction processing will be described in detail later with reference to FIG. 5. The pop operation is performed via the peek operation; hence the detailed reproduction processing is performed via the simplified reproduction processing when the pop operation is performed, but the pop operation is not limited to this. For example, in the case when the peek operation is started and shifted to the pop operation within a predetermined time, the detailed reproduction processing may be performed without performing the simplified reproduction processing, and in the case where the peek operation is started and not shifted to the pop operation within a predetermined time, the simplified reproduction processing may be performed.

In step S422, the CPU 201 determines whether another operation was performed on the operation unit 206. Processing advances to step S423 if determined another operation was performed, or to step S424 if not.

In step S423, the CPU 201 performs another processing (processing in accordance with the operation in step S422). For example, in the case where the peek operation continues for at least a predetermined time, a guide message to suggest the next operation is displayed, or detailed information (e.g. image capturing date and time) of the currently displayed image is displayed In step S424, the CPU 201 determines whether the end operation was performed on the operation unit 206. The simplified reproduction processing ends if determined that the end operation was performed, or processing advances to step S408 if not.

In this embodiment, start and end of the peek operation are detected (step S302 in FIG. 3 and S408 in FIG. 4), and a series of processing in steps S401 to S424 is performed while the peek operation continues, but the present invention is not limited to this. For example, the simplified reproduction processing may be started when the peek operation is performed, and the simplified reproduction processing may be continued regardless whether peek operation is continued.

Figure 5:
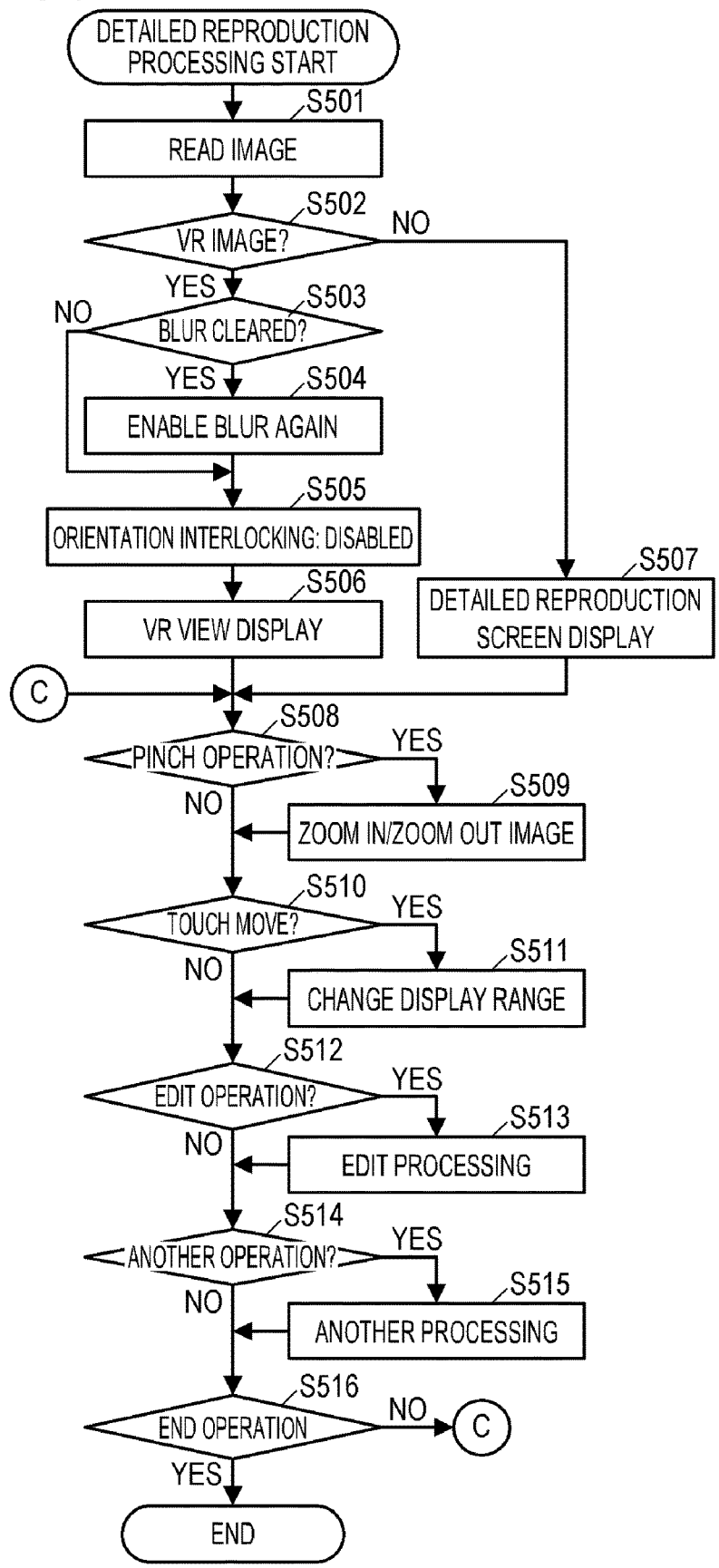
FIG. 5 is a flow chart of a detailed reproduction processing.

FIG. 5 is a flow chart depicting an example of the detailed reproduction processing of the electronic apparatus 200 (step S305 in FIG. 3 and step S421 in FIG. 4). This processing is implemented by the CPU 201 developing the program recorded in the non-volatile memory 203 in the memory 202, and executing the program.

In step S501, the CPU 201 reads an image, corresponding to a thumbnail that is displayed at a position where a tap operation (step S304 in FIG. 3) or the pop operation (step S420 in FIG. 4) was performed, from the recording medium 208.

In step S502, the CPU 201 determines whether the image read in step S501 is a VR image. Processing advances to step S503 if determined that the image is a VR image, or to step S507 if not.

In step S503, the CPU 201 determines whether editing (blur effect) was cleared in step S404 in FIG. 4. Processing advances to step S504 if determined that editing was cleared, or to step S505 if not.

In step S504, the CPU 201 enables the editing (blur effect), which was cleared in step S404, again. Thereby the VR image in a state after the editing is displayed. In the case of checking an image closely, it is preferably to display the state of the image accurately, and in the case of checking an edited image, it is preferable to display the image in the state after editing. In the case of simply checking the image, on the other hand, it is not so important that the image is in the accurate state. Rather it is preferable to display an image by which the object and the like can be easily checked, and to display an edited image in the state before editing. Therefore in this embodiment, editing is cleared in the simplified reproduction processing, and editing is enabled in the detailed reproduction processing. As a consequence, the VR image can be displayed by appropriately switching the state before editing and the state after editing.

In step S505, the CPU 201 disables the orientation interlocking mode. In the detailed reproduction processing, in which not only checking an image but also editing is possible, editing of the VR image becomes difficult if the display range of the VR image changes in accordance with the change of orientation. Hence in the detailed reproduction processing, the orientation interlocking mode is disabled. Enable/disable of the orientation interlocking mode may be switched by the user.

In step S506, the CPU 201 displays the VR image, which was read in step S501, in the VR view. In the VR view, the entire image range of the VR image can be displayed, hence the user can check the entire image range of the VR image. In the detailed reproduction processing, where the orientation interlocking mode is disabled, the display range of the VR image is changed in accordance with Touch-Move or the like. Even if the editing (blur effect) is cleared in step S404 in FIG. 4, editing is enabled again in step S504, hence the edited image is displayed in the state after editing.

As mentioned above, in the case of simply checking an image, it is preferable to display an image in which an object and the like can be easily checked. In the case of checking an image closely, it is preferable to display an image in which an object is in a state of being close to the actual state, or to display a wide range of the image. Therefore in this embodiment, the display magnification (initial magnification) of the VR image in the detailed reproduction processing (VR view in step S506) is lower than the display magnification of the VR image in the simplified reproduction processing (step S407 in FIG. 4). If the display magnification of the VR image in the detailed reproduction processing is ×1 (unmagnified), the VR image is enlarged in the simplified reproduction processing. By differentiating the display magnification of the VR image between the simplified reproduction processing and the detailed reproduction processing, browsing operability of the VR image can be improved in both cases of checking the VR image closely and checking the VR image simply. In the detailed reproduction processing, the display magnification of the image can be changed, and the display magnification can be increased so that the object and the like can be easily checked.

In step S507, the CPU 201 displays the detailed reproduction screen including the non-VR image (normal image), that was read in step S501, on the display 205.

FIG. 6D is an example of the detailed reproduction screen of the non-VR image. The non-VR image 606 is displayed on the entire detailed reproduction screen. A return button 608 to return to the thumbnails list, an image capturing date and time 609 of the currently displayed image (non-VR image 606), and an edit button 610 to specify the editing content to be performed on the currently displayed image (non-VR image 606) and the like, are also displayed.

FIG. 6K is an example of the screen which displays the VR image (partial image) 632 in VR view. The VR image 632 is displayed on the entire screen. The bottoms and the like are not displayed on the screen in FIG. 6K, but the return button 608, the image capturing date and time 609, the edit button 610 and the like in FIG. 6D are displayed when such an operation as a tap operation is performed. The display of the VR image 632 may be started in a state where the buttons and the like are not displayed, or display of the VR image 632 may be started in a state where the buttons and the like are displayed.

In step S508, the CPU 201 determines whether the pinch operation (Pinch-In/Pinch-Out) was performed on the touch panel 206a. Processing advances to step S509 if determined that the pinch operation was performed, or to step S510 if not.

In step S509, the CPU 201 changes the display magnification of the image, which was read in step S501, in accordance with the pinch operation in step S508 (zoom in/zoom out of image).

In step S510, the CPU 201 determines whether Touch-Move was performed on the touch panel 206a. Processing advances to step S511 if determined that Touch-Move was performed, or to step S512 if not.

In step S511, the CPU 201 changes the display range of the image, which was read in step S501, in accordance with Touch-Move (moving distance and moving direction of the touch position) in step S510. If the entire non-VR image is displayed, the display range is not changed. In this case, the image to be displayed may be switched from the current image to another image (image before or after the current image) in accordance with Touch-Move.

In step S512, the CPU 201 determines whether the edit operation was performed on the operation unit 206. Processing advances to step S513 if determined that the edit operation was performed, or to step S514 if not.

In step S513, the CPU 201 performs the edit processing, which was specified by the edit operation in step S512, on the image read in step S501. The edit processing is, for example, a processing to apply the blur effect or a processing to change the tinge of the image.

In step S514, the CPU 201 determines whether another operation was performed on the operation unit 206. Processing advances to step S515 if determined that another operation was performed, or to step S516 if not.

In step S515, the CPU 201 performs the other processing (processing in accordance with the operation in step S514). For example, if the area where the image capturing date and time is displayed is touched, more detailed information on the currently displayed image is displayed.

In step S516, the CPU 201 determines whether the end operation was performed on the operation unit 206. The detailed reproduction processing ends if determined that the end processing was performed, or processing advances to step S508 if not.

As described above, according to this embodiment, the display mode of the VR image (VR content), such as an omnidirectional image, is switched depending on the type of the touch operation, so that the display magnification is changed. Thereby the browsing operability of the VR image can be appropriately improved in various cases, including the case of simply checking the VR image and the case of checking the VR image closely.

In this simplified reproduction processing, a plurality of portions of the image range of the VR image may be acquired and displayed with switching sequentially. The plurality of portions to be displayed may be portions which include the seemingly main object (e.g. main individual) or may be predetermined portions. If the VR image is a moving image, a plurality of frames of this moving image may be displayed with switching sequentially. The plurality of frames may be all the frames of the moving image or a part of the frames.

The operation to start the simplified reproduction processing and the detailed reproduction processing may not be the above mentioned operations (peek operation, pop operation, tap operation). For example, whether the simplified reproduction processing is performed or the detailed reproduction processing is performed may be switched depending on the duration of the touching time, or the size of the touched surface area. Further, whether the simplified reproduction processing is performed or the detailed reproduction processing is performed may be switched depending on whether the touch operation is Touch or Hover (holding a finger or pen slightly about the touch panel).

Various controls, which were assumed to be performed by the CPU 201 in the above description, may be performed by one hardware component, or shared by a plurality of hardware components (e.g. a plurality of processors or circuits), so as to control the entire apparatus.

While the present invention has been described with reference to the preferred embodiments, the present invention is not limited to these specific embodiments, and includes various modes within the scope that does not depart from the essence of the invention. Each of the above mentioned embodiments is merely an example of the invention, and may be combined as required.

The present invention can be applied to a personal computer, a PDA, a portable telephone terminal, a portable image viewer, a printer, a digital photo frame, a music player, a game machine, an electronic book reader, and a video player. The present invention can also be applied to a digital camera, a television, a projector, a tablet terminal, an AI speaker, a home electronic device, an onboard unit and a medical apparatus.

According to this discloser, the browser operability of such VR contents as omnidirectional images can be appropriately improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-021431, filed on Feb. 8, 2019, which is hereby incorporated by reference herein in its entirety.

What is claimed is:

1. An electronic apparatus comprising at least one memory and at least one processor which function as:
   a receiving unit configured to receive a touch operation on a display surface; and
   a display control unit configured to perform control so that a list screen of items corresponding to contents stored in a storage is displayed on the display surface, wherein,
   in a case where a first touch operation is performed for an item corresponding to a VR content out of the items displayed on the list screen, the display control unit performs control so that the VR content is displayed on the display surface in a first display mode, in which a display magnification is a first magnification,
   in a case where a second touch operation is performed for an item corresponding to a VR content out of the items displayed on the list screen, the display control unit performs control so that the VR content is displayed on the display surface in a second display mode, in which the display magnification is a second magnification which is lower than the first magnification,
   in a case where the first touch operation is performed for an item corresponding to an edited VR content out of the items displayed on the list screen, the display control unit performs control so that the VR content is displayed on the display surface in the first display mode in a state before the editing, and
   in a case where the second touch operation is performed for an item corresponding to the edited VR content out of the items displayed on the list screen, the display control unit performs control so that the VR content is displayed on the display surface in the second mode in a state after the editing.

2. The electronic apparatus according to claim 1, wherein
   the first touch operation is a touch with a pressing force lower than a threshold, and
   the second touch operation is a touch with a pressing force higher than the threshold.

3. The electronic apparatus according to claim 1, wherein
   the first display mode is a mode in which only a part of an image range of a VR content is displayed, and
   the second display mode is a mode in which an entire of image range of a VR content is displayable.

4. The electronic apparatus according to claim 1, wherein
   the at least one memory and at least one processor further function as a detection unit configured to detect an orientation of the electronic apparatus,
   in a case where the orientation of the electronic apparatus changes in a state where a VR content is displayed in the first display mode in which a part of an image range is displayed as a display range, the display control unit performs a control to change the display range of the VR content in accordance with the change of orientation of the electronic apparatus, and
   in a case where the orientation of the electronic apparatus changes in a state where a VR content is displayed in the second display mode in which a part of an image range is displayed as the display range, the display control unit does not perform the control to change the display range of the VR content in accordance with the change of orientation of the electronic apparatus.

5. The electronic apparatus according to claim 1, wherein
   the first display mode is a mode to enlarge and display a VR content.

6. The electronic apparatus according to claim 1, wherein
   the first display mode is a mode to sequentially switch and display a plurality of portions of an image range of a VR content.

7. The electronic apparatus according to claim 1, wherein
   the first display mode is a mode to sequentially switch and display a plurality of frames of a moving image that is a VR content.

8. The electronic apparatus according to claim 1, wherein,
   in a case where a third touch operation is performed in a state where a VR content is displayed in the first display mode, the display control unit performs control so that a content to be displayed on the display surface is switched from the VR content to another content, and
   in a case where the third touch operation is performed in a state where a VR content is displayed in the second display mode in which a part of an image range is displayed as a display range, the display control unit performs control so that the display range of the VR content is changed in accordance with the third touch operation.

9. The electronic apparatus according to claim 8, wherein
   the first touch operation is a touch, and
   the third touch operation is moving a touch position.

10. The electronic apparatus according to claim 1, wherein
    the at least one memory and at least one processor further function as an editing unit configured to edit a VR content that is displayed in the second display mode in accordance with a user operation.

11. The electronic apparatus according to claim 1, wherein
    the difference between the first touch operation and the second touch operation is the difference in a pressing force.

12. The electronic apparatus according to claim 1, wherein
the difference between the first touch operation and the second touch operation is the difference in a duration of touching.

13. The electronic apparatus according to claim 1, wherein
the difference between the first touch operation and the second touch operation is the difference in a size of a touched surface area.

14. The electronic apparatus according to claim 1, wherein
one of the first touch operation and the second touch operation is touch, and
the other of the first touch operation and the second touch operation is hover.

15. A control method of an electronic apparatus, comprising:
a receiving step of receive a touch operation on a display surface; and
a display control step of perform control so that a list screen of items corresponding to contents stored in a storage is displayed on the display surface, wherein,
in a case where a first touch operation is performed for an item corresponding to a VR content out of the items displayed on the list screen, in the display control step, control is performed so that the VR content is displayed on the display surface in a first display mode, in which a display magnification is a first magnification,
in a case where a second touch operation is performed for an item corresponding to a VR content out of the items displayed on the list screen, in the display control step, control is performed so that the VR content is displayed on the display surface in a second display mode, in which the display magnification is a second magnification which is lower than the first magnification,
in a case where the first touch operation is performed for an item corresponding to an edited VR content out of the items displayed on the list screen, in the display control step, control is performed so that the VR content is displayed on the display surface in the first display mode in a state before the editing, and
in a case where the second touch operation is performed for an item corresponding to the edited VR content out of the items displayed on the list screen, in the display control step, control is performed so that the VR content is displayed on the display surface in the second mode in a state after the editing.

16. A non-transitory computer readable medium that stores a program, wherein the program causes a computer to execute a control method of an electronic apparatus, comprising:
a receiving step of receive a touch operation on a display surface; and
a display control step of perform control so that a list screen of items corresponding to contents stored in a storage is displayed on the display surface, wherein,
in a case where a first touch operation is performed for an item corresponding to a VR content out of the items displayed on the list screen, in the display control step, control is performed so that the VR content is displayed on the display surface in a first display mode, in which a display magnification is a first magnification,
in a case where a second touch operation is performed for an item corresponding to a VR content out of the items displayed on the list screen, in the display control step, control is performed so that the VR content is displayed on the display surface in a second display mode, in which the display magnification is a second magnification which is lower than the first magnification,
in a case where the first touch operation is performed for an item corresponding to an edited VR content out of the items displayed on the list screen, in the display control step, control is performed so that the VR content is displayed on the display surface in the first display mode in a state before the editing, and
in a case where the second touch operation is performed for an item corresponding to the edited VR content out of the items displayed on the list screen, in the display control step, control is performed so that the VR content is displayed on the display surface in the second mode in a state after the editing.

* * * * *